(12) United States Patent
Bittleston

(10) Patent No.: US 6,671,223 B2
(45) Date of Patent: Dec. 30, 2003

(54) CONTROL DEVICES FOR CONTROLLING THE POSITION OF A MARINE SEISMIC STREAMER

(75) Inventor: Simon Hastings Bittleston, Slependen (NO)

(73) Assignee: WesternGeco, L.L.C., Houston, TX (US)

(*) Notice: Subject to any disclaimer, the term of this patent is extended or adjusted under 35 U.S.C. 154(b) by 1 day.

(21) Appl. No.: 09/893,234

(22) Filed: Jun. 26, 2001

(65) Prior Publication Data

US 2002/0126575 A1 Sep. 12, 2002

Related U.S. Application Data

(63) Continuation of application No. 09/284,030, filed on Apr. 6, 1999, now abandoned.

(30) Foreign Application Priority Data

Dec. 20, 1996 (GB) .............................................. 9626442

(51) Int. Cl.[7] .................................................. B63G 8/14
(52) U.S. Cl. ......................................... 367/19; 114/245
(58) Field of Search ...................... 367/19, 18; 114/244

(56) References Cited

U.S. PATENT DOCUMENTS

| | | | | |
|---|---|---|---|---|
| 3,605,674 A | | 9/1971 | Weese | 114/235 |
| 3,774,570 A | * | 11/1973 | Pearson | 114/235 |
| 4,711,194 A | * | 12/1987 | Fowler | 114/245 |
| 4,745,583 A | * | 5/1988 | Motal | 367/18 |
| 4,912,684 A | | 3/1990 | Fowler | 367/76 |
| 4,992,990 A | * | 2/1991 | Langeland | 367/19 |
| 5,402,745 A | | 4/1995 | Wood | 114/244 |
| 5,443,027 A | * | 8/1995 | Owsley | 114/244 |
| 5,619,474 A | * | 4/1997 | Kuche | 367/17 |
| 6,011,753 A | * | 1/2000 | Chien | 367/21 |

FOREIGN PATENT DOCUMENTS

| | | | | |
|---|---|---|---|---|
| EP | 0193215 A2 | * | 9/1986 | G01V/1/38 |
| GB | 2331971 A | * | 6/1999 | G01V/1/38 |
| WO | WO 96/21163 | * | 7/1996 | G01S/5/14 |
| WO | WO 97/30361 | * | 8/1997 | G01V/1/38 |
| WO | WO 98/28636 | * | 7/1998 | G01V/1/38 |

* cited by examiner

Primary Examiner—John Barlow
Assistant Examiner—Victor J. Taylor
(74) Attorney, Agent, or Firm—Streets & Steele; David S. Figatner

(57) ABSTRACT

A control device or "bird" for controlling the position of a marine seismic streamer is provided with an elongate, partly flexible body which is designed to be electrically and mechanically connected in series with a streamer. In its preferred form, the bird has two opposed wings which are independently controllable in order to control the streamer's lateral position as well as its depth.

29 Claims, 2 Drawing Sheets

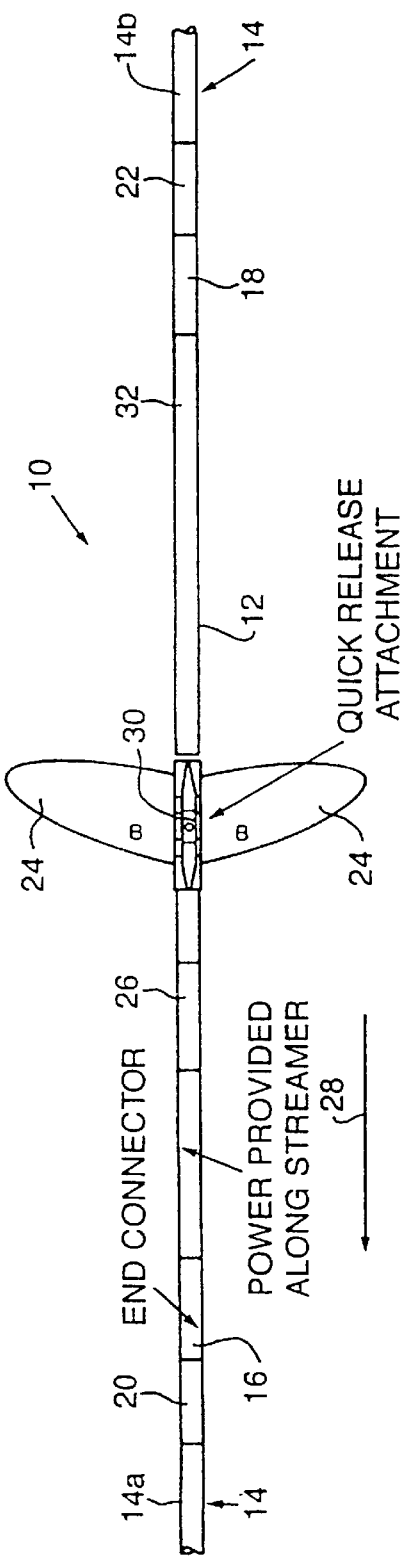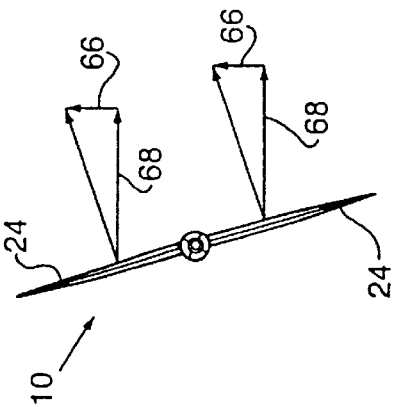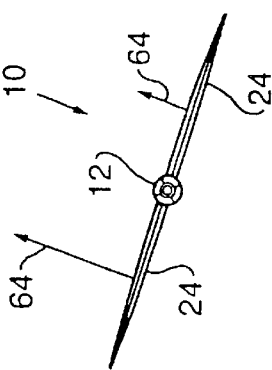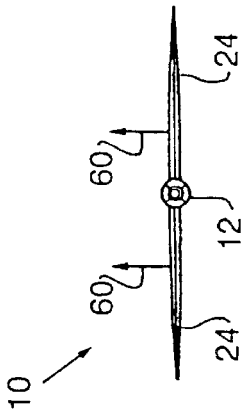

CONTROL DEVICES FOR CONTROLLING THE POSITION OF A MARINE SEISMIC STREAMER

This is a Continuation of U.S. patent application Ser. No. 09/284,030 filed on Apr. 6, 1999, now abandoned.

BACKGROUND OF THE INVENTION

This invention relates to control devices for controlling the position of a marine seismic streamer.

A marine seismic streamer is an elongate cable-like structure, typically up to several thousand meters long, which contains arrays of hydrophones and associated electronic equipment along its length, and which is used in marine seismic surveying. In order to perform a 3D marine seismic survey, a plurality of such streamers are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones, and then digitised and processed to build up a representation of the earth strata in the area being surveyed.

The streamers are typically towed at a constant depth of about ten meters, in order to facilitate the removal of undesired "ghost" reflections from the surface of the water. To keep the streamers at this constant depth, control devices known as "birds", attached to each streamer at intervals of 200 to 300 meters, are used.

Current designs of birds are battery-powered, and comprise a relatively heavy body which is suspended beneath the streamer, and which has a pair of laterally projecting wings (hence the name "bird"), one on each side. The combination of streamer and birds is arranged to be neutrally buoyant, and the angle of attack of both wings is adjusted in unison from time to time to control the depth of the streamer.

Birds in accordance with these current designs suffer from a number of disadvantages. Because they are battery-powered, the batteries can run out before the survey is completed, necessitating either retrieval of the streamer for battery replacement, or deployment of a work boat to replace the battery in the water. The former operation is very time consuming, while the latter can be hazardous. Further, because the birds hang beneath the streamer, they produce considerable noise as they are towed through the water, which noise interferes with the reflected signals detected by the hydrophones in the streamers. The hanging of the birds from the streamers also means that the birds need to be detached each time the streamer is retrieved and re-attached each time it is re-deployed, which is again rather time consuming.

During the seismic survey, the streamers are intended to remain straight, parallel to each other and equally spaced. However, after deploying the streamers, it is typically necessary for the vessel to cruise in a straight line for at least three streamer lengths before the streamer distribution approximates to this ideal arrangement and the survey can begin. This increases the time taken to carry out the survey, and therefore increases the cost of the survey. But because of sea currents, the streamers frequently fail to accurately follow the path of the seismic survey vessel, sometimes deviating from this path by an angle, known as the feathering angle, of up to 10°. This can adversely affect the coverage of the survey, frequently requiring that certain parts of the survey be repeated. In really bad circumstances, the streamers can actually become entangled, which though rare, causes great damage and considerable financial loss. Current designs of birds can do nothing to alleviate any of these lateral streamer positioning problems.

SUMMARY OF THE INVENTION

It is therefore an object of the present invention to provide novel streamer control devices which alleviate at least some of the disadvantages of the current designs, and/or which possess more functionality than the current designs.

According to the present invention, there is provided a control device for controlling the position of a marine seismic streamer, the device comprising a body mechanically connected in series between two adjacent sections of the streamer, sensor means in the body for determining its angular position in a plane perpendicular to the longitudinal axis of the streamer, two opposed control surfaces projecting outwardly from the body, each control surface being rotatable about an axis which in use extends transversely of the streamer, and control means responsive to control signals and the sensor means for independently adjusting the respective angular positions of said two control surfaces so as to control the lateral position of the streamer as well as its depth.

In a preferred embodiment of the invention, for use with a multi-section streamer which includes an electric power line, the control means is at least partly electrical and arranged in use to receive electric power from said electric power line.

When the streamer also includes a control line, the control means is preferably arranged in use to receive control signals from the control line.

The control means preferably includes at least one electrical motor, and may also include means for sensing the respective angular positions of the two control surfaces.

Conveniently, said two control surfaces rotate about a common axis.

Advantageously, each of the two control surfaces comprises a respective wing-like member which is swept back with respect to the direction of tow of the streamer.

Preferably, said control surfaces are releasably secured to the body, which may be adapted to be non-rotatably coupled to the streamer.

BRIEF DESCRIPTION OF THE DRAWINGS

The invention will now be described, by way of example only, with reference to the accompanying drawings, of which:

FIG. 1 is a somewhat schematic representation of a preferred embodiment of a streamer control device in accordance with the present invention;

FIGS. 3 to 5 illustrate the operation of the streamer control device of FIG. 1.

DETAILED DESCRIPTION OF THE PREFERRED EMBODIMENT

Figure 2:
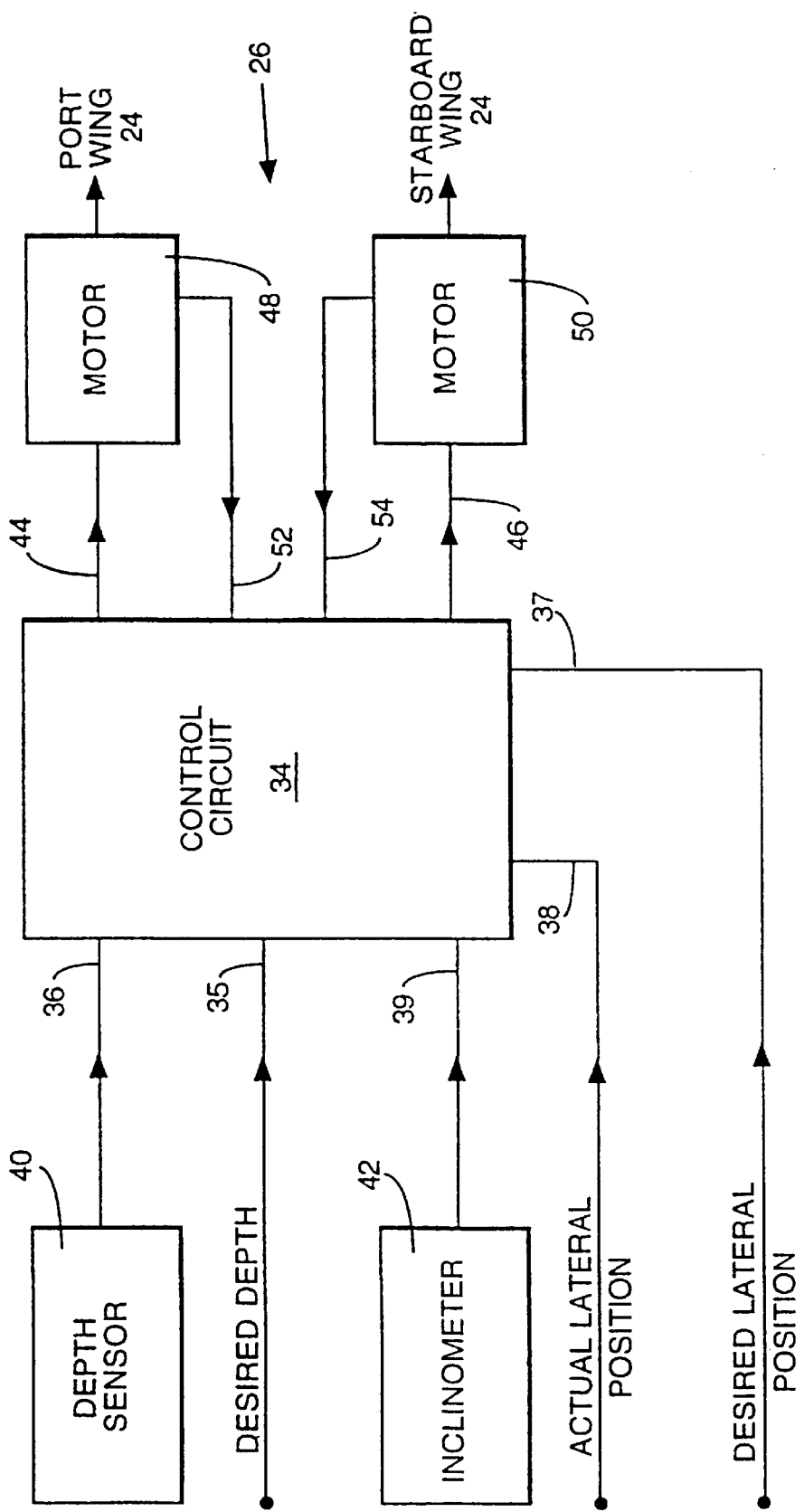
FIG. 2 is a simple schematic of a control system forming part of the streamer control device of FIG. 1.

The streamer control device, or "bird", of FIG. 1 is indicated generally at 10, and comprises an elongate streamlined body 12 adapted to be mechanically and electrically connected in series in a multi-section marine seismic streamer 14 of the kind which is towed by a seismic survey vessel and which is used, in conjunction with a seismic source also towed by the vessel, to conduct seismic surveys, as briefly described hereinbefore. To permit such connection, each end of the body 12 is provided with a respective mechanical and electrical connector 16, 18, these connectors being complementary to, and designed to interconnect with, streamer end connectors 20, 22 respectively which are normally used to join together adjacent sections 14a and 14b of the streamer 14.

The bird 10 is provided with two opposed control surfaces, or wings, 24, typically moulded from a fibre-reinforced plastics material, which project horizontally outwardly from the body 12 and which are independently rotatable about a common axis extending substantially perpendicularly through the longitudinal axis of the body. Rotation of the wings 24 is effected under the control of a control system 26 sealingly housed within the body 12. The wings 24 are generally ogival (ie rounded) and swept back with respect to the direction of tow of the streamer 14 (which direction is indicated by the arrow 28), in order to reduce the possibility of debris becoming hooked on them. To facilitate their rapid removal and reattachment, the wings 24 are secured to body 12 by a quick-release attachment 30.

As mentioned hereinbefore, the streamer 14 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from the streamer section 14a to the streamer section 14b via respective corresponding lines 32 which extend through the body 12 of the bird 10 between the connectors 16, 18. Additionally, the control system 26 is connected to receive control signals and electric power from respective ones of the lines 32.

The greater part of the length of the body 12 of the bird 10 is flexible, the only rigid parts being the connectors 20, 22, and a short central section which houses the control system 26 and from which the wings 24 project. This central section, which is made of aluminium or titanium and has holes passing longitudinally therethrough for the passage of Kevlar or other stress members which bear the longitudinal loads on the body 12, is kept as short as possible, typically around 40 cm, so that once the wings 24 have been detached from the body 12, the streamer 14 can be wound onto and unwound from the large drum used for storing the streamer, with the body 12 still connected in the streamer. The quick-release attachment 30 permits the removal and attachment of the wings 24 to be at least partly automated as the streamer 14 is reeled in and out during the survey.

The reason for providing the elongate flexible parts of the body 12 is to provide enough length for the inclusion of one or more hydrophones or hydrophone groups, should this be necessary to preserve a desired uniform hydrophone spacing along the length of streamer 14. If no hydrophones need to be included, the flexible parts of the body 12 can be omitted altogether, along with the aforementioned stress members.

The control system 26 is schematically illustrated in FIG. 2, and comprises a microprocessor-based control circuit 34 having respective inputs 35 to 39 to receive control signals representative of desired depth, actual depth, desired lateral position, actual lateral position and roll angle of the bird 10 (ie the angular position of the body 12 in a plane perpendicular to the longitudinal axis of the streamer 14). The desired depth signal can be either a fixed signal corresponding to the aforementioned 10 meters, or an adjustable signal, while the actual depth signal is typically produced by a depth sensor 40 mounted in or on the bird 10. The lateral position signals are typically derived from a position determining system of the kind described in our U.S. Pat. No. 4,992,990 or our International Patent Application No WO9621163. The roll angle signal is produced by an inclinometer 42 mounted within the bird 10.

The control circuit 34 has two control outputs 44, 46, connected to control respective electrical stepper motors 48, 50, each of which is drivingly connected to a respective one of the wings 24. The stepper motors 48, 50 have respective outputs at which they produce signals representative of their respective current angular positions (and therefore of the current angular positions of the wings 24), which outputs are connected to respective control inputs 52, 54 of the control circuit 34.

In operation, the control circuit 34 receives between its inputs 35 and 36 a signal indicative of the difference between the actual and desired depths of the bird 10, and receives between its inputs 37 and 38 a signal indicative of the difference between the actual and desired lateral positions of the bird 10. These two difference signals are used by the control circuit 34 to calculate the roll angle of the bird 10 and the respective angular positions of the wings 24 which together will produce the necessary combination of vertical force (upwardly or downwardly) and lateral force (left or right) required to move the bird 10 to the desired depth and lateral position. The control circuit 34 then adjusts each of the wings 24 independently by means of the stepper motors 48, 50, so as to start to achieve the calculated bird roll angle and wing angular positions.

FIGS. 3 to 5 illustrate the operation of the bird 10 in the case where the streamer 14 is slightly heavy (slightly negative buoyancy), and the bird 10 thus needs to produce lift to maintain the streamer at the desired depth. This lift is produced by the flow of the water over the wings 24 of the bird 10, resulting from the 5 knot towing speed of the streamer 14 through the water, and can be changed by changing the angle of attack of the wings with respect to the flow. The magnitude of the lift required for the situation envisaged by FIG. 3 is indicated by the length of the arrows 60.

If the streamer 14 now needs to be moved laterally to the right (as viewed in FIGS. 3 to 5), the angular position of the left wing 24 of the bird 10 is first adjusted to increase its lift, while the angular position of the right wing is adjusted to decrease its lift, as represented by the length of the arrows 64 in FIG. 4, thus causing the bird 10 to roll clockwise from the position shown in FIG. 3 to the position shown in FIG. 4. This clockwise roll continues until the bird 10 reaches the steady state condition shown in FIG. 5, where it can be seen that the vertical component of the lift produced by the wings 24, indicated by the arrows 66, is equal to the lift represented by the arrows 60 of FIG. 3 required to maintain the streamer 14 at the desired depth, while the much larger horizontal component, represented by the arrows 68, moves the streamer 14 to the right.

While adjusting the angular positions of the wings 24 of the bird 10, the control circuit 34 continuously receives signals representative of the actual angular positions of the wings from the stepper motors 48, 50, as well as a signal representative of the actual roll angle of the bird from the inclinometer 42, to enable it to determine when the calculated wing angular positions and bird roll angle have been reached. And as the aforementioned difference signals at the inputs 35 to 38 of the control circuit 34 reduce, the control circuit repeatedly recalculates the progressively changing values of the roll angle of the bird 10 and the angular positions of the wings 24 required for the bird and streamer reach the desired depth and lateral position, until the bird and streamer actually reach the desired depth and lateral position.

The body of the bird 10 does not rotate with respect to the streamer 14, and thus twists the streamer as it rolls. The streamer 14 resists this twisting motion, so acting as a kind of torsion spring which tends to return the bird 10 to its normal position (ie with the wings 24 extending horizontally). However, this spring returning action, though beneficial, is not essential, and the bird 10 can if desired be designed to rotate to a certain extent with respect to the axis of the streamer 14.

It will be appreciated that the bird 10 has several important advantages with respect to prior art birds. Its in-line connection in the streamer 14 not only reduces the noise it generates as the streamer is towed through the water, but also enables it to derive power and control signals via the streamer and so obviates the need for batteries (although they may still be provided if desired for back-up purposes). But most importantly, it enables the horizontal or lateral position of the streamer 14 to be controlled, and not just its depth.

Another significant advantage of the bird 10 is that by virtue of the shortness of the stiff parts of the respective body 12 and the easily detachable wings 24, it does not need to be removed from the streamer 14 during winding and unwinding. This saves a considerable amount of time when carrying out the seismic survey.

Many modifications can be made to the bird 10. For example, the wings 24 can be staggered slightly along the length of the body 12, in order to provide slightly more room for their respective drive trains. Additionally, the electric motors 48, 50 can be replaced by hydraulic actuators.

What is claimed is:

1. A control device for controlling the position of a marine seismic streamer, the device comprising:
   a body mechanically adapted to be connected in series between two adjacent sections of the streamer;
   sensor means in the body for determining its angular position in a plane approximately perpendicular to the longitudinal axis of the streamer;
   two opposed control surfaces projecting outwardly form the body, each control surface being rotatable about an axis which extends transversely of the streamer; and
   control means responsive to control signals and the sensor means for independently adjusting the respective angular positions of said two control surfaces so as to control the lateral position of the streamer as well as its depth.

2. The control device of claim 1, wherein the marine seismic streamer is a multi-section streamer that includes an electric power line, the control device further comprising an electrical connection means capable of connecting to the electric power line, wherein the control means is at least partly electrical and arranged in use to receive electrical power from the electric power line.

3. The control device of claim 1, wherein the marine seismic streamer includes a control line, the control device further comprising a control line connection, wherein the control means is arranged in use to receive control signals from the control line.

4. The control device of claim 1, wherein the two control surfaces are releasably secured to the body.

5. The control device of claim 1, wherein the two control surfaces are secured to the body by quick-release attachments.

6. The control device of claim 5, wherein the body is adapted to be wound onto a streamer drum while still connected to the steamer.

7. The control device of claim 1, wherein the body is at least partly flexible.

8. The control device of claim 1, wherein the body is of approximately the same diameter as the streamer.

9. The control device of claim 1, wherein the control means includes at least one electrical motor.

10. The control device of claim 1, wherein the control means includes at least one hydraulic actuator.

11. The control device of claim 1, wherein the control means includes means for sensing the angular position of each of the two control surfaces.

12. The control device of claim 1, wherein the two control surfaces rotate about a common axis.

13. The control device of claim 1, wherein each of the two control surfaces comprises a respective wing-like member that is swept back with respect to the direction of tow of the streamer.

14. The control device of claim 1, wherein the body is adapted to be non-rotatably coupled to the streamer.

15. The control device of claim 1, wherein the central section is constructed of material selected from aluminum, titanium, and combinations thereof.

16. The control device of claim 1, wherein the one or more elongate sections providing length for inclusion of one or more hydrophones.

17. The control device of claim 1, wherein the control means further comprises:
   a control circuit in communication with means for determining a depth of the control device, means for determining a lateral position of the control device, and means for determining a roll angle.

18. The control device of claim 17, wherein the control circuit is microprocessor-based.

19. The control device of claim 17, wherein the control circuit comprises at least two control outputs, each control output being connected to respective means to independently adjust the angular positions of each of the control surfaces.

20. A control device for controlling the position of a marine seismic streamer, the device comprising:
   a body mechanically adapted to be coupled to the streamer;
   two opposed control surfaces projecting outwardly form the body, each control surface being rotatable about an axis which extends transversely of the streamer; and
   control means responsive to control signals for independently adjusting the respective angular positions of said control surfaces so as to control the lateral position of the streamer as well as the depth.

21. The control device of claim 20, further comprising:
   sensor means in the body for determining the angular position of the body in a plane approximately perpendicular to the longitudinal axis of the streamer, wherein the control means is responsive to the sensor means.

22. The control device of claim 20, wherein the two control surfaces are releasably secured to the body.

23. The control device of claim 20, wherein the two control surfaces are secured to the body by quick-release attachments.

24. The control device of claim 23, wherein the body is adapted to be wound onto a streamer drum while still connected to the streamer.

25. The control device of claim 20, wherein the control means includes at least one electrical motor.

26. The control device of claim 20, wherein the control means includes at least one hydraulic actuator.

27. The control device of claim 20, wherein the two control surfaces rotate about a common axis.

28. The control device of claim 20, wherein each of the two control surfaces comprises a respective wing-like member that is swept back with respect to the direction of tow of the streamer.

29. The control device of claim 20, wherein the body is adapted to be non-rotatably coupled to the streamer.

* * * * *

(12) INTER PARTES REEXAMINATION CERTIFICATE (0065th)
United States Patent
Bittleston

(10) Number: US 6,671,223 C1
(45) Certificate Issued: May 12, 2009

(54) CONTROL DEVICES FOR CONTROLLING THE POSITION OF A MARINE SEISMIC STREAMER

(75) Inventor: Simon Hastings Bittleston, Slependen (NO)

(73) Assignee: WesternGeco, L.L.C., Houston, TX (US)

Reexamination Request:
No. 95/000,078, Feb. 23, 2005

Reexamination Certificate for:
Patent No.: 6,671,223
Issued: Dec. 30, 2003
Appl. No.: 09/893,234
Filed: Jun. 26, 2001

Related U.S. Application Data

(63) Continuation of application No. 09/284,030, filed as application No. PCT/GB1997/003507 on Dec. 19, 1997, now abandoned.

(30) Foreign Application Priority Data

Dec. 20, 1996 (GB) .............................................. 9626442

(51) Int. Cl.
*G01V 1/38* (2006.01)
*B63G 8/14* (2006.01)

(52) U.S. Cl. ......................................... 367/19; 114/245
(58) Field of Classification Search .................... 367/16, 367/17, 18, 19
See application file for complete search history.

(56) References Cited

U.S. PATENT DOCUMENTS

| | | | |
|---|---|---|---|
| 3,375,800 A | 4/1968 | Cole et al. | |
| 3,412,705 A | 11/1968 | Nesson | |
| 3,434,446 A | 3/1969 | Cole | |
| 3,434,451 A | 3/1969 | Brainard, II | |
| 3,440,992 A | 4/1969 | Chance | |
| 3,560,912 A | 2/1971 | Spink et al. | |
| 3,605,674 A | 9/1971 | Weese | |
| 3,648,642 A | 3/1972 | Fetrow et al. | |
| 3,896,756 A | 7/1975 | Pearson et al. | |
| 3,931,608 A | 1/1976 | Cole | |
| 3,943,483 A | 3/1976 | Strange | |
| 3,961,303 A | 6/1976 | Paitson | |
| 4,033,278 A | 7/1977 | Waters | |

(Continued)

FOREIGN PATENT DOCUMENTS

| | | |
|---|---|---|
| AU | 734810 | 7/1998 |
| CA | 2270719 | 7/1998 |
| DE | 69702673 | 4/2001 |
| EP | 0193215 | 1/1986 |
| EP | 0319716 | 6/1989 |
| EP | 0321705 | 6/1989 |
| EP | 0390987 | 10/1990 |
| EP | 0525391 | 2/1993 |
| EP | 0581441 | 2/1994 |
| EP | 0613025 | 8/1994 |
| EP | 0613025 | 9/1998 |
| EP | 0909701 | 4/1999 |
| GB | 2093610 | 9/1982 |
| GB | 2122562 | 1/1984 |
| GB | 9656442.9 | 12/1998 |
| GB | 2331971 | 6/1999 |
| GB | 2342081 | 4/2000 |
| NO | 992701 | 6/1999 |
| WO | WO 95/31735 | 11/1995 |
| WO | WO 96/21163 | 7/1996 |
| WO | WO 97/11395 | 3/1997 |

(Continued)

*Primary Examiner*—Peter C. English

(57) ABSTRACT

A control device or "bird" for controlling the position of a marine seismic streamer is provided with an elongate, partly flexible body which is designed to be electrically and mechanically connected in series with a streamer. In its preferred form, the bird has two opposed wings which are independently controllable in order to control the streamer's lateral position as well as its depth.

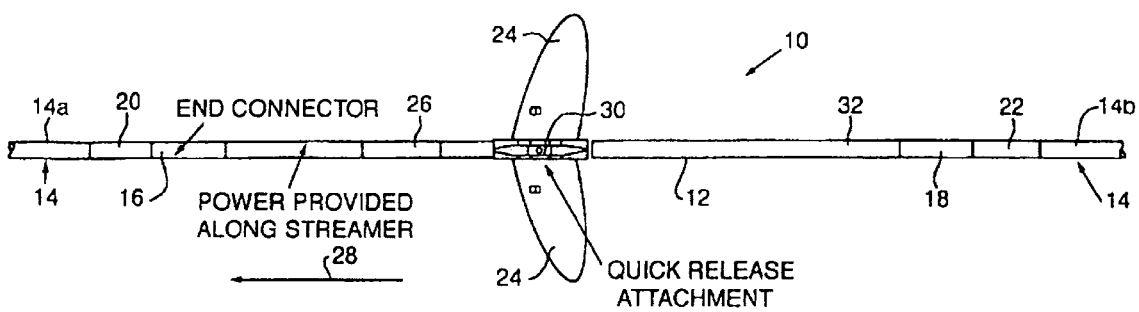

U.S. PATENT DOCUMENTS

| | | |
|---|---|---|
| 4,063,213 A | 12/1977 | Itria et al. |
| 4,087,780 A | 5/1978 | Itria et al. |
| 4,222,340 A | 9/1980 | Cole |
| 4,227,479 A | 10/1980 | Gertler et al. |
| 4,290,124 A | 9/1981 | Cole |
| 4,313,392 A | 2/1982 | Guenther et al. |
| 4,323,989 A | 4/1982 | Huckabee et al. |
| 4,404,664 A | 9/1983 | Zachariadis |
| 4,463,701 A | 8/1984 | Pickett et al. |
| 4,484,534 A | 11/1984 | Thillaye du Boullay |
| 4,676,183 A | 6/1987 | Conboy |
| 4,694,435 A | 9/1987 | Magneville |
| 4,709,355 A | 11/1987 | Woods et al. |
| 4,723,501 A | 2/1988 | Hovden et al. |
| 4,729,333 A | 3/1988 | Kirby et al. |
| 4,766,441 A | 8/1988 | Phillips et al. |
| 4,767,183 A | 8/1988 | Martin |
| 4,843,996 A | 7/1989 | Darche |
| 4,890,568 A | 1/1990 | Dolengowski |
| 4,890,569 A | 1/1990 | Givens |
| 5,042,413 A | 8/1991 | Benoit |
| 5,052,814 A | 10/1991 | Stubblefield |
| 5,507,243 A | 4/1996 | Williams et al. |
| 5,517,202 A | 5/1996 | Patel et al. |
| 5,517,463 A | 5/1996 | Hornbostel et al. |
| 5,529,011 A | 6/1996 | Williams, Jr. |
| 5,532,975 A | 7/1996 | Elholm |
| 5,642,330 A | 6/1997 | Santopietro |
| 5,790,472 A | 8/1998 | Workman et al. |
| 5,927,606 A | 7/1999 | Patterson |
| 6,011,752 A | 1/2000 | Ambs et al. |
| 6,016,286 A | 1/2000 | Olivier et al. |
| 6,142,091 A * | 11/2000 | Henriksen .................. 114/245 |
| 6,144,342 A | 11/2000 | Bertheas et al. |
| 6,459,653 B1 | 10/2002 | Kuche |
| 6,525,992 B1 | 2/2003 | Olivier et al. |
| 6,549,653 B1 | 4/2003 | Osawa et al. |
| 6,879,542 B2 | 4/2005 | Soreau et al. |

FOREIGN PATENT DOCUMENTS

| | | |
|---|---|---|
| WO | WO 97/30361 | 8/1997 |
| WO | WO 97/45006 A1 * | 12/1997 |
| WO | WO 97/45006 | 12/1997 |
| WO | WO 98/28636 | 7/1998 |
| WO | WO 99/04293 | 1/1999 |

* cited by examiner

US 6,671,223 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 5–6:

This is a Continuation of U.S. patent application Ser. No. 09/284,030 filed on Apr. 6, 1999, now abandoned, *which is a National Stage of International Application No. PCT/GB97/03507, filed Dec. 19, 1997.*

AS A RESULT OF REEXAMINATION, IT HAS BEEN DETERMINED THAT:

Claims 10, 15 and 26 are cancelled.

Claims 1, 16 and 20 are determined to be patentable as amended.

Claims 2–9, 11–14, 17–19, 21–25 and 27–29, dependent on an amended claim, are determined to be patentable.

New claims 30–66 are added and determined to be patentable.

1. A control device for controlling the position of a marine seismic streamer, the device comprising:
   a body mechanically adapted to be connected in series between two adjacent sections of the streamer;
   sensor means in the body for determining its angular position in a plane approximately perpendicular to the longitudinal axis of the streamer;
   two opposed control surfaces projecting outwardly [form] *from* the body, each control surface being rotatable about an axis which extends transversely of the streamer; and
   control means responsive to control signals and the sensor means for independently adjusting the respective angular positions of said two control surfaces so as to control the lateral position of the streamer as well as its depth.

16. The control device of claim 1, wherein the *body includes* one or more elongate sections providing length for inclusion of one or more hydrophones.

20. A control device for controlling the position of a marine seismic streamer, the device comprising:
   a body mechanically adapted to be coupled to the streamer;
   two opposed control surfaces projecting outwardly [form] *from* the body, each control surface being rotatable about an axis which extends transversely of the streamer; and
   control means responsive to control signals for independently adjusting the respective angular positions of said control surfaces so as to control the lateral position of the streamer as well as the depth.

*30. The control device of claim 1, wherein the body is flexible except for portions that connect the body to the streamer and a central section which houses said control means.*

*31. The control device of claim 1, wherein the control surfaces project horizontally outwardly from the body.*

*32. The control device of claim 1, wherein the control surfaces rotate about a common axis extending substantially perpendicularly through a longitudinal axis of the body.*

*33. The control device of claim 29, wherein said control signals are received from lines which extends through said body and are adapted to connect with control lines within the streamer.*

*34. The control device of claim 33, further comprising an electrical connector adapted to connect with and receive electrical power from the electrical power lines within the streamer.*

*35. The control device of claim 29, further comprising an electrical connector adapted to connect with and receive electrical power from the electrical power lines within the streamer.*

*36. The control device of claim 20, wherein said body is adapted to be connected in series between two adjacent sections of the streamer.*

*37. The control device of claim 36, wherein said body includes respective end portions each provided with a mechanical connector adapted to connect to one of said two adjacent sections of the streamer, thereby joining together said two adjacent sections of the streamer.*

*38. The control device of claim 37, wherein said control signals are received from the lines which extend through said body and are adapted to connect with control lines within the streamer.*

*39. The control device of claim 38, further comprising an electrical connector adapted to connect with and receive electrical power from electrical power lines within the streamer.*

*40. The control device of claim 37, further comprising an electrical connector adapted to connect with and receive electrical power from electrical power lines within the streamer.*

*41. The control device of claim 36, wherein said control signals are received from lines which extend through said body and are adapted to connect with control lines within the streamer.*

*42. The control device of claim 41, further comprising an electrical connector adapted to connect with and receive electrical power from electrical power lines within the streamer.*

*43. The control device of claim 36, further comprising an electrical connector adapted to connect with and receive electrical power from electrical power lines within the streamer.*

*44. The control device of claim 20, wherein the body is flexible except for portions that connect the body to the streamer and a central section which houses said control means.*

*45. The control device of claim 20, wherein the control surfaces project horizontally outwardly from the body.*

*46. The control device of claim 20, wherein the control surfaces rotate about a common axis extending substantially perpendicularly through a longitudinal axis of the body.*

*47. A control device for controlling the position of a marine seismic streamer, the device comprising:
   a body mechanically adapted to be connected in series between two adjacent sections of the streamer, wherein said body includes respective end portions each pro-* vided with a mechanical connector adapted to connect to one of said two adjacent sections of the streamer, thereby joining together said two adjacent sections of the streamer;

sensor means in the body for determining its angular position in a plane approximately perpendicular to the longitudinal axis of the streamer;

two opposed control surfaces projecting outwardly from the body, each control surface being rotatable about an axis which extends transversely of the streamer; and control means responsive to control signals and the sensor means for independently adjusting the respective angular positions of said two control surfaces so as to control the lateral position of the streamer as well as its depth.

48. The control device of claim 47, wherein the marine seismic streamer is a multi-section streamer that includes an electric power line, the control device further comprising an electrical connector adapted to connect to the electric power line, wherein the control means receives electrical power from the electric power line.

49. The control device of claim 47, wherein the marine seismic streamer includes a control line, the control device further comprising a control line connection, wherein the control means is configured to receive control signals from the control line.

50. The control device of claim 47, wherein the two control surfaces are releasably secured to the body.

51. The control device of claim 47, wherein the two control surfaces are secured to the body by quick-release attachments.

52. The control device of claim 51, wherein the body is adapted to be wound onto a streamer drum while still connected to the streamer.

53. The control device of claim 47, wherein the body is at least partly flexible.

54. The control device of claim 47, wherein the body is of approximately the same diameter as the streamer.

55. The control device of claim 47, wherein the control means includes at least one electrical motor.

56. The control device of claim 47, wherein the control means includes means for sensing the angular position of each of the two control surfaces.

57. The control device of claim 47, wherein the two control surfaces rotate about a common axis.

58. The control device of claim 47, wherein each of the two control surfaces comprises a respective wing-like member that is swept back with respect to the direction of tow of the streamer.

59. The control device of claim 47, wherein the body is adapted to be non-rotatably coupled to the streamer.

60. The control device of claim 47, wherein the body includes one or more elongate sections providing length for inclusion of one or more hydrophones.

61. The control device of claim 47, wherein the control means further comprises:

a control circuit in communication with means for determining a depth of the control device, means for determining a lateral position of the control device, and means for determining a roll angle.

62. The control device of claim 61, wherein the control circuit is microprocessor-based.

63. The control device of claim 62, wherein the control circuit comprises at least two control outputs, each control output being connected to respective means for independently adjusting angular positions of each of the control surfaces.

64. The control device of claim 47, wherein the body is flexible except for the mechanical connectors that connect the body to the streamer and a central section which houses said control means.

65. The control device of claim 47, wherein the control surfaces project horizontally outwardly from the body.

66. The control device of claim 47, wherein the control surfaces rotate about a common axis extending substantially perpendicularly through a longitudinal axis of the body.

* * * * *